(12) United States Patent
Qu et al.

(10) Patent No.: US 9,465,924 B2
(45) Date of Patent: Oct. 11, 2016

(54) APPARATUS FOR PREVENTING REPLAY ATTACK AND METHOD FOR PREVENTING REPLAY ATTACK

(71) Applicants: PEKING UNIVERSITY, Beijing (CN); PEKING UNIVERSITY FOUNDER GROUP CO., LTD., Beijing (CN); FOUNDER APABI TECHNOLOGY LIMITED, Beijing (CN)

(72) Inventors: Cheng Qu, Beijing (CN); Yinyan Yu, Beijing (CN); Zhi Tang, Beijing (CN)

(73) Assignees: PEKING UNIVERSITY, Beijing (CN); PEKING UNIVERSITY FOUNDER GROUP CO., LTD., Beijing (CN); FOUNDER APABI TECHNOLOGY LIMITED, Beijing (CN)

( * ) Notice: Subject to any disclaimer, the term of this patent is extended or adjusted under 35 U.S.C. 154(b) by 0 days.

(21) Appl. No.: 14/102,686

(22) Filed: Dec. 11, 2013

(65) Prior Publication Data
US 2014/0250535 A1    Sep. 4, 2014

(30) Foreign Application Priority Data
Mar. 1, 2013 (CN) .......................... 2013 1 0066626

(51) Int. Cl.
| G06F 21/10 | (2013.01) |
| H04L 29/06 | (2006.01) |
| G06F 21/64 | (2013.01) |

(52) U.S. Cl.
CPC ............... *G06F 21/10* (2013.01); *G06F 21/64* (2013.01); *H04L 63/0823* (2013.01)

(58) Field of Classification Search
CPC ........................... G06F 21/10; H04L 63/0823
USPC .................... 726/26; 713/156, 190
See application file for complete search history.

(56) References Cited

U.S. PATENT DOCUMENTS

| 5,809,501 | A | * | 9/1998 | Noven | ................... H04L 45/742 |
| 6,681,212 | B1 | * | 1/2004 | Zeng | ....................... G06F 21/10 380/255 |
| 7,444,067 | B2 | * | 10/2008 | Moon | ................... G11B 27/036 386/278 |
| 7,603,397 | B1 | * | 10/2009 | Hagerstrom | ......... G06F 11/1435 |
| 2007/0008852 | A1 | * | 1/2007 | Kobayashi | ................... 369/53.2 |
| 2007/0162953 | A1 | * | 7/2007 | Bolliger | ............ G06F 17/30056 725/142 |
| 2009/0295911 | A1 | * | 12/2009 | Grim et al. | ..................... 348/61 |
| 2011/0142227 | A1 | * | 6/2011 | Lee et al. | ........................ 380/28 |
| 2012/0066289 | A1 | * | 3/2012 | Bland | ..................... G06F 21/10 709/203 |
| 2012/0079281 | A1 | * | 3/2012 | Lowenstein | .......... G06F 21/602 713/189 |

* cited by examiner

*Primary Examiner* — Dao Ho
(74) *Attorney, Agent, or Firm* — Brinks Gilson & Lione

(57) ABSTRACT

An apparatus for preventing replay attacks and a method for preventing replay attacks are provided in this invention, wherein the apparatus for preventing replay attacks comprises: an acquisition unit for, when a request for operating a digital content is received, acquiring current location information of a set of placeholder files; a determination unit for determining whether the current location information is consistent with recorded location information of the placeholder file; a protection unit for, when inconsistent as determined by the determination unit, wherein there is a correspondence between the digital content and the set of placeholder files.

15 Claims, 8 Drawing Sheets

APPARATUS FOR PREVENTING REPLAY ATTACK AND METHOD FOR PREVENTING REPLAY ATTACK

CROSS-REFERENCE TO RELATED APPLICATIONS

This application claims priority to Chinese Patent Application No. 201310066626.8, filed on Mar. 1, 2013 and entitled "APPARATUS FOR PREVENTING REPLAY ATTACK AND METHOD FOR PREVENTING REPLAY ATTACK", which is incorporated herein by reference in its entirety.

FIELD OF THE INVENTION

The present invention relates to the field of computer techniques, and more particular, to an apparatus for preventing replay attacks and a method for preventing replay attacks.

DESCRIPTION OF THE RELATED ART

With the development of digital techniques, reading mediums have changed significantly. Paper books are now being gradually replaced by eBooks. However, since the digital contents have the attributes of, such as, easy to lossless duplicate, modify and distribute, intellectual property issues are always a main factor hindering positive development of the digital market.

Digital Rights Management (DRM) is a series of software/hardware techniques for IP protection of various kinds of digital contents to guarantee the legal use of digital contents during their lifecycles, balancing each party's benefit and demand on the value chain of digital contents, and promoting the positive development of digital market and information propagation. Specifically, DRM includes the description, identification, transaction, protection, monitoring and tracing of the use of various kinds of digital contents.

In a DRM system, digital content licenses are used to describe information on rights owned by users in terms of authorized digital contents. According to a definition in related techniques, rights objects (RO) may be further classified into stateless ROs and stateful ROs. For a stateless RO, a device does not need to manage its state information; for a stateful RO, a device may accurately utilize internal rights and constraints of the object by managing its state information. Constraints contained in state information may comprise "allowable print count", "accumulated time", etc. State information specifies total allowable amounts for a RO, and each piece of state information is managed on a stateful RO. Digital content licenses are medium for recording state information.

The replay attack to digital contents' stateful rights is a serious problem that puzzled DRM technique providers all the time, which may heavily harm the interests of digital content providers. Object files suffering from replay attacks may be different depending upon different recording methods used for stateful rights, which however essentially have the same principle: backup and reuse. Two replay attack methods were generalized for the dynamic licenses (licenses that record state information of stateful rights and may be updated with the use of the stateful rights) in a document "Replay Attack of Dynamic Rights within an Authorised Domain": the first one is replacing digital content licenses of partially or all consumed stateful rights with digital content licenses backed up previously; the second is, after transferring rights to other devices, continuing the use of digital content licenses containing the transferred rights on the original device. Due to the presence of the second replay attack methods, it is difficult to actually achieve the transfer of rights in a C2C secondary distribution process, unable to ensure that original purchasers will no longer use corresponding digital contents after the transfer of ownership of their digital contents.

Existing detection methods are based on client contents and cannot prevent replay attacks on stateful rights of digital contents. Because users may back up all files involved in anti-replay detection at any time, after consuming a certain amount of stateful rights, the states of the rights may be recovered by overwriting current files with the copies backed up previously.

Online detection methods based on servers may solve the problem of replay attacks on stateful rights of digital contents, which may be applicable for those digital contents with high security requirements. However, online detection may not only increase workloads of servers, but also cause inconvenience in ordinary user's fair use of digital contents.

Currently, methods based on additional hardware have been proposed, in which TPM (Trusted Platform Module) chips are generally introduced and some record information is written into the storage areas of TPM chips, the corresponding information being updated upon each use of stateful rights. Whether replay attack has been occurred is detected with the help of record information in the storage areas of TPM chips. However, not all general devices (such as PCs, notebook computers) have TPM chips installed therein. Thus, the methods of introducing TPM chips against replay attacks to stateful rights do not have universality.

Further, digital content licenses adopted in some methods proposed in some documents may be updated with the use of stateful rights by users. For such digital content licenses, instead of digitally signing all contents in addition to signature information in the licenses, their publishers may only provide digital signatures for those license contents that may not be updated with user's use. Although the digital contents licenses start from the time it is issues to the clients, and the integrity may be detected for such digital content licenses in other ways, unsigned contents may be tampered with by attackers in transmission paths when they are issued to clients from publishers. Without other security measures, clients cannot verify the integrity of licenses just received based on digital signature of the licenses.

In summary, methods for addressing replay attacks to stateful rights of digital contents may not satisfy the requirements of validity, convenience and universality at the same time.

SUMMARY OF THE INVENTION

In view of technical problems in related techniques, the technical problem to be solved in this invention is to provide a technique for preventing replay attacks on the rights, in which user's replay attacks may be prevented by detecting from a placeholder file information area of a log file whether placeholder files have been moved illegally and whether the log file has been overwritten by a previous backup copy.

According to an aspect of this invention, an apparatus for preventing replay attacks is provided, comprising: an acquisition unit for when a request for operating a digital content is received, acquiring current location information of a set of placeholder files; a determination unit for determining whether the current location information is consistent with recorded location information of the placeholder file; a protection unit for when inconsistent as determined by the determination unit, preventing an operation performed on the digital content, wherein there is a correspondence between the digital content and the set of placeholder files.

In this technical solution, a concept of a set of placeholder files is proposed. If the log file has not been overwritten with a previous duplication and/or if the set of placeholder files has not been moved illegally, the actual location of the set of placeholder files should be consistent with the recorded location information of the placeholder file, when it is determined that the actual location of the set of placeholder files is inconsistent with the recorded location information of the placeholder file, it may be determined that the log file has been overwritten with a previous duplication and/or the set of placeholder files has been moved illegally, so that replay attacks to stateful rights may be prevented. Thus, without online server detection, replay attacks to stateful rights may be detected by client terminals themselves, meeting the requirement of universality.

In the above technical solution, preferably, the protection unit is further configured to, when consistency has been determined by the determination unit, perform the operation on the digital content; the terminal further comprises: a moving unit for moving the location of the set of placeholder files, and an update unit for storing current location information of the set of placeholder files, generating a hash value based on new location information of the set of placeholder files, replacing the placeholder file location information with the hash value, and updating use records of the digital content, wherein the set of placeholder files comprises at least one placeholder file.

In order to ensure that whether the log file has been overwritten with a previous duplication and/or whether the set of placeholder files has been moved illegally in following operations by means of the log file and the set of placeholder files, after the completion of each operation, the set of placeholder files is moved, a new hash value is generated based on the new location of the set of placeholder files, and the recorded location information of the placeholder file is updated; for a next corresponding operation, whether a corresponding operation is allowable may be still determined according to the above determination method.

In the above technical solution, preferably, updating use records of the digital content by the update unit comprises updating a list of rights information in the log file, wherein the list of rights information is used to record rights use information corresponding to the digital content.

There is an item corresponding to each digital content in the list of rights information; a corresponding item will be deleted when a digital content is deleted by a user; when a digital content is added by a user, a corresponding item is added in the rights information list; when the digital content is used by a user, the content of a corresponding item is changed.

In the above technical solution, preferably, the recorded location information of the placeholder file is stored in a placeholder file information area of the log file; the log file further comprises a message authentication code area for storing a MAC (Message Authentication Code) of the list of the rights information and the placeholder file information area.

In the above technical solution, preferably, the determination unit is further configured to, before acquiring the current location information of the set of placeholder files, generate a MAC value according to contents of the list of the rights information and the placeholder file information area, determine whether the MAC is consistent with content stored in the message authentication code area; the protection unit is further configured to, when inconsistency has been determined, prevent performing the operation on the digital content.

Before determining whether a replay attack to stateful rights occurs based on the log file, it's also necessary to determine the integrity of the log file, to determine whether the log file has been tampered with and thus to ensure the accuracy of the determination.

In any above technical solution, preferably, the operation comprises adding the digital content, deleting the digital content, using a stateful right and/or transferring rights (including stateful rights and stateless rights) of the digital content owned on a terminal to another terminal, the placeholder files including image files.

In the above technical solution, preferably, the determination unit is further configured to, when the operation makes use of a stateful right, determine whether the stateful right is useable according to the rights use information corresponding to the digital content in the log file.

Because the log file has rights use information corresponding to each digital content recorded therein, i.e., constraints on the use of rights, it is further necessary to determine whether it is allowed to use the right even after a determination that the log file has not been overwritten with a previous duplication and the placeholder files have not been moved illegally has been made.

In any above technical solution, preferably, the determination unit is further configured to, in the case of the use of a stateful right or right transfer, if it is determined that the current location information of the placeholder files is consistent with the content in the placeholder file information area in the log file, further determine the integrity of the digital content's license. The digital content's license may comprise stateless rights of the digital content. A digital signature is generated according to contents in the license except for signature information, and the integrity and validity of the digital content's license may be determined based on the digital signature.

According to another aspect of this invention, a terminal is further provided, comprising the apparatus for preventing replay attacks of any above technical solutions.

According to another aspect of this invention, a method for preventing replay attacks is further provided, comprising: receiving a request for performing an operation on a digital content, and acquiring current location information of a set of placeholder files; determining whether the current location information is consistent with recorded location information of the placeholder file; when the determination result is inconsistent, preventing the operation performed on the digital content; wherein there is a correspondence between the digital content and the set of placeholder files.

In this technical solution, a concept of a set of placeholder files is proposed. If the log file has not been overwritten with a previous duplication and/or if the set of placeholder files has not been moved illegally, the actual location of the set of placeholder files should be consistent with the recorded location information of the placeholder file, when it is determined that the actual location of the set of placeholder files is inconsistent with the recorded location information of the placeholder file, it may be determined that the log file has been overwritten with a previous duplication and/or the set of placeholder files has been moved illegally, so that replay attacks to stateful rights may be prevented. Thus, without online server detection, replay attacks to stateful rights may be detected by clients themselves, meeting the requirement of universality.

In the above technical solution, preferably, further comprising: when the determination result is consistency, performing the operation on the digital content; updating use records of the digital content; moving the location of the set of placeholder files, wherein the set of placeholder files comprises at least one placeholder file; storing current location information of the set of placeholder files, generating a hash value based on new location information of the set of placeholder files, replacing the placeholder file location information with the hash value.

In order to ensure that whether the log file has been overwritten with a previous duplication and/or whether the set of placeholder files has been moved illegally in following operations by means of the log file and the set of placeholder files, after the completion of each operation, the set of placeholder files is moved, a new hash value is generated based on a new location of the set of placeholder files to update the recorded location information of the placeholder file; for a next corresponding operation, whether a corresponding operation is allowable may be still determined according to the above determination method.

In the above technical solution, preferably, updating use records of the digital content comprises updating a list of rights information in a log file, wherein the list of rights information is used to record rights use information corresponding to the digital content.

There is a corresponding item corresponding to each digital content in the list of rights information; a corresponding item will be deleted when a digital content is deleted by a user; when a digital content is added by a user, a corresponding item is added in the list of rights information; when the digital content is used by a user, the content of a corresponding item is changed.

In the above technical solution, preferably, the recorded location information of the placeholder file is stored in a placeholder file information area of the log file, the method may further comprise: the log file further comprises a message authentication code area for storing a MAC of the list of rights information and the placeholder file information area.

In the above technical solution, preferably, before acquiring the current location information of the set of placeholder files, a MAC is generated according to contents of the list of rights information and the placeholder file information area, it is determined whether the MAC is consistent with content stored in the message authentication code area; when it is determined inconsistent, the operation to be performed on the digital content is prevented.

Before determining whether a replay attack to a stateful right occurs based on the log file, it's also necessary to determine the integrity of the log file, to determine whether the log file has been tampered with, and thus to ensure the accuracy of the determination.

In any above technical solution, preferably, the operation comprises adding the digital content, deleting the digital content, using a stateful right and/or transferring rights (including stateful rights and stateless rights) of the digital content owned on a terminal to another terminal, the placeholder files including image files.

In the above technical solution, preferably, when the operation makes use of a stateful right, the method for preventing replay attacks further comprises determining whether the stateful right is useable according to the rights use information corresponding to the digital content in the log file.

Because the log file has rights use information corresponding to each digital content recorded therein, i.e., constraints on the use of rights, it is further necessary to determine whether it is allowed to use the right even after a determination that the log file has not been overwritten with a previous duplication and the placeholder files have not been moved illegally has been made.

In any above technical solution, preferably, in the case of the use of a stateful right or right transfer, if it is determined that the current location information of the placeholder files is consistent with the contents in the placeholder file information area in the log file, a further determination is made about the integrity of the digital content's license. The digital content's license may comprise stateless rights of the digital content, a digital signature is generated according to contents in the license except for signature information, and the integrity and validity of the digital content's license may be determined based on the digital signature.

DESCRIPTION OF THE EMBODIMENTS

For a more distinct understanding of the above objects, features and advantageous of this invention, it will be described in a further detail with reference to drawings and particular embodiments below. It should be noticed that, in the situation of no conflicts, embodiments and features of embodiments of this invention may be combined with each other.

Many details will be set forth in the following description to achieve a throughout understanding of this invention, however, this invention may be implemented in other ways different from that disclosed herein, and therefore this invention is not limited to the particular embodiments disclosed below.

Figure 1:
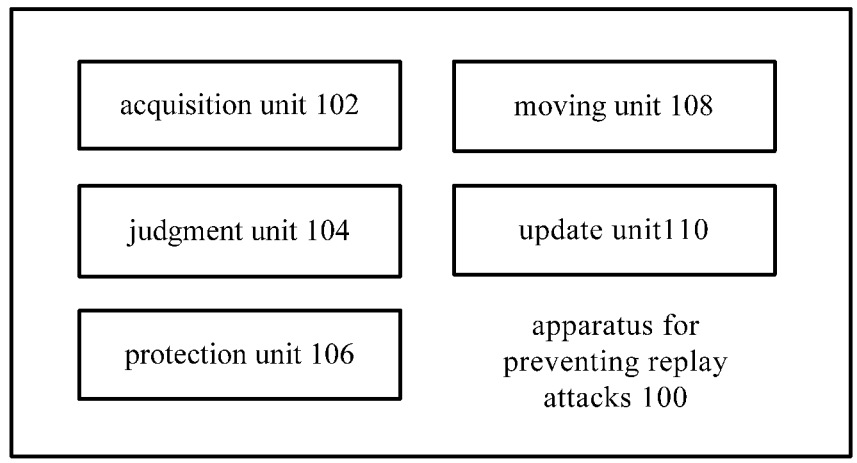
FIG. 1 shows a block diagram of an apparatus for preventing replay attacks according to an embodiment of this invention.

FIG. 1 shows a block diagram of a terminal according to an embodiment of this invention.

The terminal 100 according to an embodiment of this invention may comprise: an acquisition unit 102, for acquiring current location information of a set of placeholder files (in a storage medium of the terminal) when a request for operating a digital content is received; a judgment unit 104, for determining whether the current location information is consistent with recorded location information of the placeholder files; a protection unit 106, for preventing an operation on the digital content when the judgment unit has determined the inconsistency, wherein there is a correspondence between the digital content and the set of placeholder files.

Thus, in this technical solution, a concept of a set of placeholder files is proposed. If the log file has not been overwritten with a previous duplication and/or if the set of placeholder files has not been moved illegally, the actual location of the set of placeholder files should be consistent with the recorded location information of the placeholder files, when it is determined that the actual location of the set of placeholder files is inconsistent with the recorded location information of the placeholder file, it may be determined that the log file has been overwritten with a previous duplication and/or the set of placeholder files has been moved illegally, so that replay attacks on stateful rights may be prevented. Thus, replay attacks on stateful rights may be detected by clients themselves without online server detection, and it has generality.

Preferably, the protection unit 106 is further used to perform the operation on the digital content when the judgment unit has determined the consistency. The terminal further comprises: a moving unit 108 and an update unit 110; the moving unit 108 is used to move the location of the set of placeholder files (to change the location of the set of placeholder files in the storage medium), and the update unit 110 is used to store current location information of the set of placeholder files, generate a hash value based on new location information of the set of placeholder files, replace the original location information of the placeholder file with the hash value, and update use record of the digital content, wherein the set of placeholder files comprises at least one placeholder file.

In order to ensure that whether the log file has been replaced with a previous duplication and/or whether the set of placeholder files has been moved illegally in following operations by means of the log file and the set of placeholder files, each time the operation is completed, the set of placeholder files is moved, a new hash value is generated based on the new location of the set of placeholder files, and the recorded location information of the placeholder file is updated. For a next corresponding operation, whether a corresponding operation is allowable may be still determined according to the above judgment method.

Preferably, updating use records of the digital content by the update unit 110 comprises updating a list of rights information in the log file, wherein the list of rights information is used to record use information of the rights corresponding to the digital content.

There is a corresponding item corresponding to each digital content in the list of rights information. The corresponding item will be deleted when a digital content is deleted by a user. When a digital content is added by a user, a corresponding item is added in the list of rights information. When the digital content is used by a user, the content of a corresponding item is changed.

Preferably, the recorded location information of the placeholder file is stored in a placeholder file information area of the log file; the log file further comprises a message authentication code area for storing a MAC (Message Authentication Code) of the rights information list and the placeholder file information area.

Before determining whether a replay attack on stateful rights occurs based on the log file, it's also necessary to determine the integrity of the log file, to determine whether the log file has been tampered with and thus to ensure the accuracy of the determination.

Preferably, the judgment unit 104 is further configured to, before acquiring the current location information of the set of placeholder files, generate a MAC according to contents of the rights information list and the placeholder file information area, determine whether the MAC is consistent with content stored in the message authentication code area; the protection unit 106 is further used to, when inconsistent is determined, prevent performing the operation on the digital content.

Preferably, the operation comprises adding the digital contents, deleting the digital contents, using the stateful right and/or transferring the right on the digital contents owned by the terminal to another terminal. The placeholder file may comprise an image file.

Preferably, the judgment unit 104 is further used to, when the operation is the use of a stateful right, determine whether the stateful right is useable according to the rights use information corresponding to the digital content in the log file.

Because the log file has rights use information corresponding to each digital content recorded therein, i.e., constraints on the use of stateful rights, it is further necessary to determine whether it is allowed to use the stateful right even after a determination that the log file has not been overwritten with a previous copy and the placeholder files have not been moved illegally has been made.

Preferably, the judgment unit 104 is further used to, in the case of the use of a stateful right or right transfer, if it is determined that the current location information of set of the placeholder files is consistent with the content in the placeholder file information area in the log file, further determine the integrity of the digital content's license. The digital content's license may comprise stateless rights of the digital content. A digital signature is generated according to contents in the license except the signature information, and the integrity and validity of the digital content's license may be determined based on the digital signature.

A terminal according to this invention comprises the apparatus 100 for preventing replay attacks described in the above embodiment. The terminal according to this invention is applicable to general computer devices, such as noteBook computers, portable mobile devices, printers, which have hard disks as their storage medium.

Figure 2:
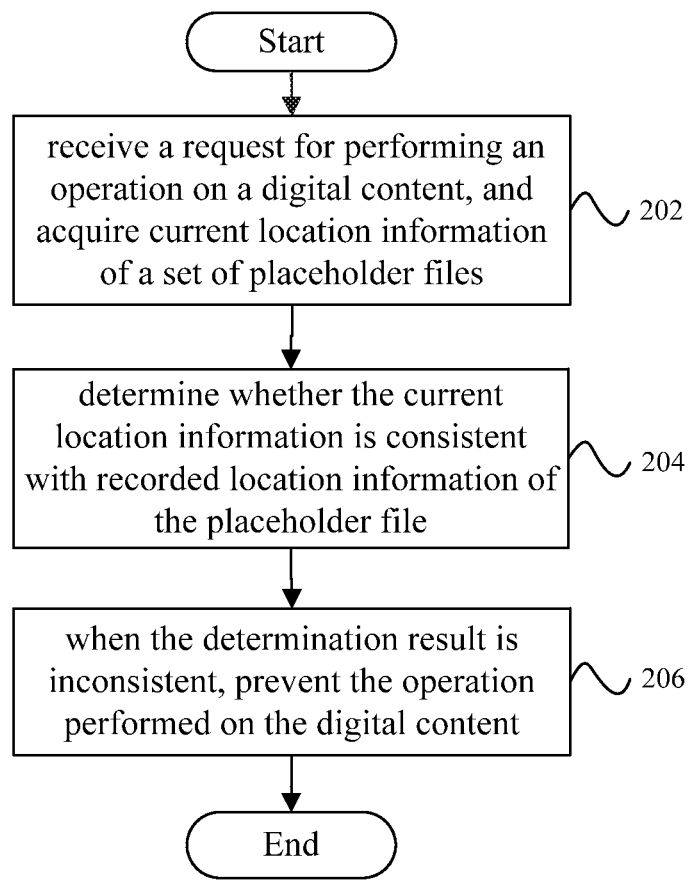
FIG. 2 shows a flowchart of a method for preventing replay attacks according to an embodiment of this invention.

FIG. 2 shows a flowchart of a method for preventing replay attacks according to an embodiment of this invention.

The method for preventing replay attacks according to an embodiment of this invention comprises: at step 202, receiving a request for performing an operation on a digital content, and acquiring current location information of a set of placeholder files; at step 204, determining whether the current location information is consistent with recorded location information of the placeholder file; at step 206, when the determination result is inconsistent, preventing the operation performed on the digital content; wherein there is a correspondence between the digital content and the set of placeholder files.

In this technical solution, a concept of a set of placeholder files is proposed. If the log file has not been overwritten with a previous duplication and/or if the set of placeholder files has not been moved illegally, the actual location of the set of placeholder files should be consistent with the recorded location information of the placeholder file. When it is determined that the actual location of the set of placeholder files is inconsistent with the recorded location information of the placeholder file, it may be determined that the log file has been overwritten with a previous duplication and/or the set of placeholder files has been moved illegally, so that replay attacks on stateful rights may be prevented. Thus, without online server detection, replay attacks on stateful rights may be detected by clients themselves, meeting the requirement of universality.

Preferably, the method for preventing replay attacks according to this invention further comprises the following steps: when the determination result is consistent, performing the operation on the digital content; updating use records of the digital content; moving the location of the set of placeholder files, wherein the set of placeholder files comprises at least one placeholder file; storing current location information of the set of placeholder files, generating a hash value based on new location information of the set of placeholder files, replacing the placeholder file location information with the hash value.

In order to ensure that whether the log file has been overwritten with a previous duplication and/or whether the set of placeholder files has been moved illegally in following operations by means of the log file and the set of placeholder files, after the completion of each operation, the set of placeholder files is moved, a new hash value is generated based on a new location of the set of placeholder files to update contents in the placeholder file information area of the log file. For a next corresponding operation, whether a corresponding operation is allowable may be still determined according to the above determination method.

In the above technical solution, preferably, updating use records of the digital content comprises updating a list of rights information in a log file, wherein the list of rights information is used to record rights use information corresponding to the digital content.

There is a corresponding item corresponding to each digital content in the list of rights information; a corresponding item will be deleted when a digital content is deleted by a user; when a digital content is added by a user, a corresponding item is added in the list of rights information; when the digital content is used by a user, the content of a corresponding item is changed.

In the above technical solution, preferably, the recorded location information of the placeholder file is stored in a placeholder file information area of the log file, the method may further comprise: the log file further comprises a message authentication code area for storing a MAC of the rights information list and the placeholder file information area.

In the above technical solution, preferably, before acquiring the current location information of the set of placeholder files, a MAC is generated according to the list of the rights information and the content of the placeholder file information area, it is determined whether the MAC is consistent with content stored in the message authentication code area; when inconsistent is determined, the operation to be performed on the digital content is prevented.

Before determining whether a replay attack on a stateful right occurs based on the log file, it's also necessary to determine the integrity of the log file, to determine whether the log file has been tampered with, and thus to ensure the accuracy of the determination.

Preferably, the above operation may comprise adding digital contents, deleting digital contents, using the stateful right and/or transferring the rights (including stateless rights and stateful rights) of the digital contents owned by the client to another client. The placeholder file comprises image files.

Preferably, when the operation is using a stateful right, the method of preventing replay attacks may further comprises: determining whether the stateful right is usable based on the right use information of the log file corresponding to the digital contents.

Because the log file has rights use information corresponding to each digital content recorded therein, i.e., constraints on the use of rights, it is further necessary to determine whether it is allowed to use the right even after a determination that the log file has not been overwritten with a previous duplication and the placeholder files have not been moved illegally has been made.

In any above technical solution, preferably, in the case of the use of a stateful right or right transfer, if it is determined that the current location information of the set of the placeholder files is consistent with the contents in the placeholder file information area in the log file, a further determination is made about the integrity of the digital content's license. The digital content's license may comprise stateless rights of the digital content, a digital signature is generated according to contents in the license except the signature information, and the integrity and validity of the digital content's license may be determined based on the digital signature.

Before a further description of technical solutions of this invention, relevant terms and processing steps will be explained for the convenience of understanding the embodiments set forth below.

In this embodiment, the type of digital contents is eBooks, it should be appreciated that digital contents may comprise any contents that are subjects of IP protection.

Before being able to perform transactions, a user has to register an account on a digital content provider's website. A general process of obtaining an authorized eBook on a terminal is as follows: select an eBook to purchase and pay online; obtain an eBook file from a distribution server, and obtain a digital content license file from a license server.

An eBook reader on a client is provided with a built-in DRM controller (that is the apparatus for preventing replay attacks of this invention, which is an apparatus corresponding to a method preventing replay attacks), a user may transfer the obtained rights (including stateful rights and stateless rights) from one device (source device) to another device (target device) through a C2C secondary distribution process. The transfer process does not need the participation of a license server, however the DRM controller on the client must employ an agent signature technique to sign a digital content license on the target device. The contents of the transfer of rights are all rights obtained by the user with respect to the eBook.

Before a detailed description of the processes in the method for preventing replay attacks of this invention, information and relevant process steps involved in this invention will be described first.

Adding or deleting an eBook must be performed through the DRM controller on the client. Wherein, the operation of adding an eBook is automatically accomplished after the user successfully gets a digital content license, an operation of deleting an eBook may be triggered by the user initiatively, or may be accomplished automatically after the user transfers his/her rights from the source device to the target device successfully.

File objects mainly involved in embodiments of this invention comprise: eBook files, digital content license files, a log file and placeholder files. The relationships between these four kinds of files are as follows: each eBook file corresponds to a digital content license file, each digital content license file corresponds to an item of a list of rights information in the log file, and a log file corresponds to one or more placeholder files. The digital content license file is used to describe information about rights owned by the user with respect to an authorized digital content, the log file is used to record the user's use of stateful rights and location information of the placeholder files, and the placeholder file is a file for which its storage location and file size may be changed by the DRM controller of the client.

The eBook obtained by the user is encrypted and can be used only after decryption. The digital content license is bound to a device used by the user to purchase the eBook, and is allowed to use only on the bound device. A key for decrypting the eBook may be carried in the digital content license.

The stateful rights specified in the digital content license comprise View and Print. A constraint on the right of View is an accumulated time, and a constraint on the right of Print is a Print count. The digital content license comprises a unique identifier of the license, a unique identifier of the digital content, right and constrains, digital signatures, etc.

A right may represent an action, i.e., a specific operation having a semantic association with some resource, which may be performed on those resources by a subject in an authorized environment. Right objects may be divided into stateless right objects and stateful right objects. For example, "View" without an "accumulated time" constraint is a stateless right, while "Print" with a "Print count" constraint is a stateful right. Stateless rights and stateful rights may be converted to each other by modifying their constraints.

A digital signature is used to verify the validity and integrity of a license. The publisher of a license may calculate a digital signature for all information except the signature information in the digital content license using his/her private key to get signature data, and then sends the license with the signature data attached to the user; the DRM controller on the client may verify the validity and integrity of the license through a signature verification process according to a public key issued by the publisher of the license.

The contents of the license do not vary with the use of the digital content by the user, and the user's use of stateful rights is recorded in the log file. When the user transfer rights owned by him from one device to another device, the DRM controller on the client makes use of an agent signature technique to ensure the validity and integrity of the license.

Figure 3:
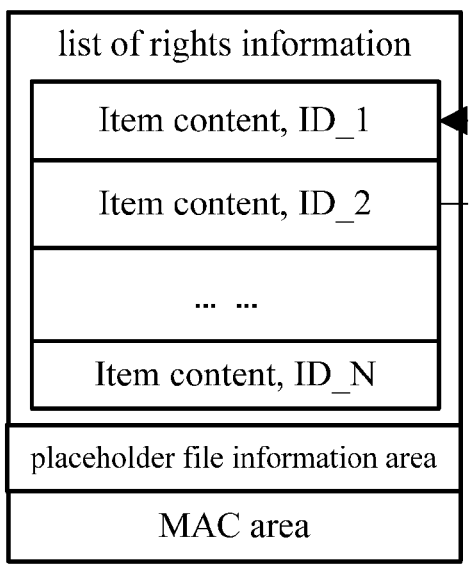
FIG. 3 shows a schematic diagram of the structure of a log file according to an embodiment of this invention.

The log file is fixed to one file, and its number does not vary with the increase of the number of eBooks. The log file comprises three parts: a list of rights information, a placeholder file information area, and a MAC area, as shown in FIG. 3. Each item of the list of rights information records the use of a stateful right of the eBook by the user. A hash value obtained after a hash transform process performed on the location information of the placeholder file is stored in the placeholder file information area, wherein the location information of the placeholder file may comprise initial sector/cluster number of three placeholder files. A MAC value for contents in the placeholder file information area and the list of rights information is stored in the message authentication code area.

The storage medium adopted in devices applied in embodiments of this invention is HD (Hard Disk). Files are stored in units of sector/clusters, a file with a size less than a sector/cluster occupies a sector/cluster also. Data of two different files cannot be contained in the same sector/cluster, and a file may occupy multiple sector/clusters, which may be discontinuous sector/clusters.

The way of moving placeholder files in embodiments of this invention comprises the use of file manipulation commands provided on operating systems (such as copy, ren, move, del, etc. on the DOS system). For an individual placeholder file, it may be moved through three steps: first, generate a duplication of the placeholder file, which has a file name different to its original file name at this point; second, delete the original placeholder file; and third, change the name of the duplication of the placeholder file to its original file name.

Figure 4:
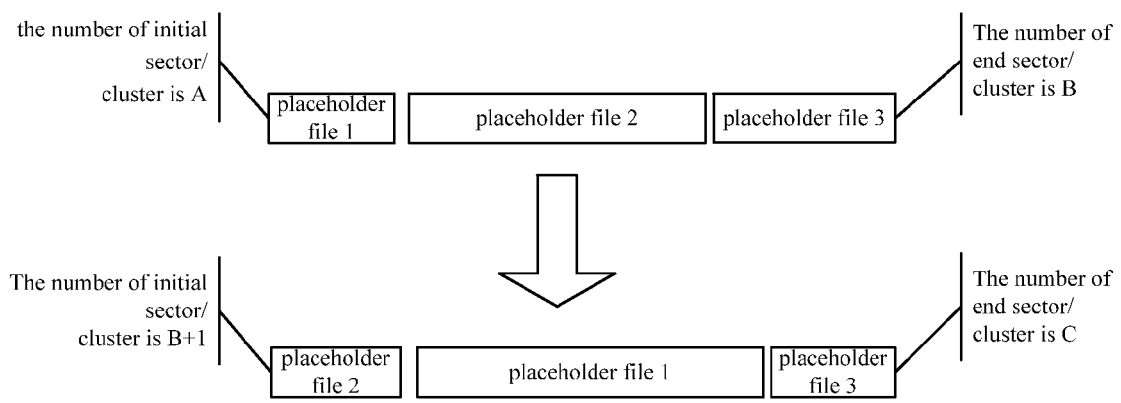
FIG. 4 shows a schematic diagram of moving placeholder files randomly according to an embodiment of this invention.

In the moving process, the three placeholder files are used in conjunction with each other, and are moved sequentially in each round according to a random moving order, the size of each placeholder file being modified also when the placeholder file is moved. FIG. 4 is a schematic diagram of randomly moving three placeholder files with variable file sizes. As shown in FIG. 4, before the moving process, placeholder files 1, 2 and 3, indifferent sizes and thus possessing different numbers of sector/clusters, have initial sector/cluster number increased in sequence, and the end sector/cluster number of placeholder file 3 is B. In the moving process, placeholder file 2 is moved at first, which has a initial sector/cluster number B+1, then placeholder file 1 is moved and finally placeholder file 3 is moved. When moving each placeholder file, its file size is changed also, and thus the number of sector/clusters occupied is changed as well. As a comparison before and after the moving process, relative locations of the three placeholder files vary accordingly. With such a moving process, the probability of the three placeholder files simultaneously returning to their initial locations in a past time after several rounds of moving processes may be greatly decreased, and thereby the security level of the method for preventing replay attacks may be improved.

In general, sector/clusters allocated to a placeholder file duplication generated by a file manipulation command provided on an OS have certain continuity in their sector/cluster numbers. However, sector/clusters allocated to a newly generated file may be impacted by practical distributions of free HD sector/clusters. In some situations, sector/clusters numbers allocated to a generated placeholder file duplication may not be continuous. However, this may not impact the security level of the embodiment of this invention.

BMP files with an image depth of 8-bit may be used as placeholder files. If the ranges of length and width of the image are both 1-1024 pixels, the file has a maximum size of 1 MB. The size of a placeholder file may be changed by changing the length and width of the image at each movement of the placeholder file.

Below, the method for preventing replay attacks when performing operations on a digital content will be described in detail in conjunction with FIG. 5 to FIG. 9.

Figure 5:
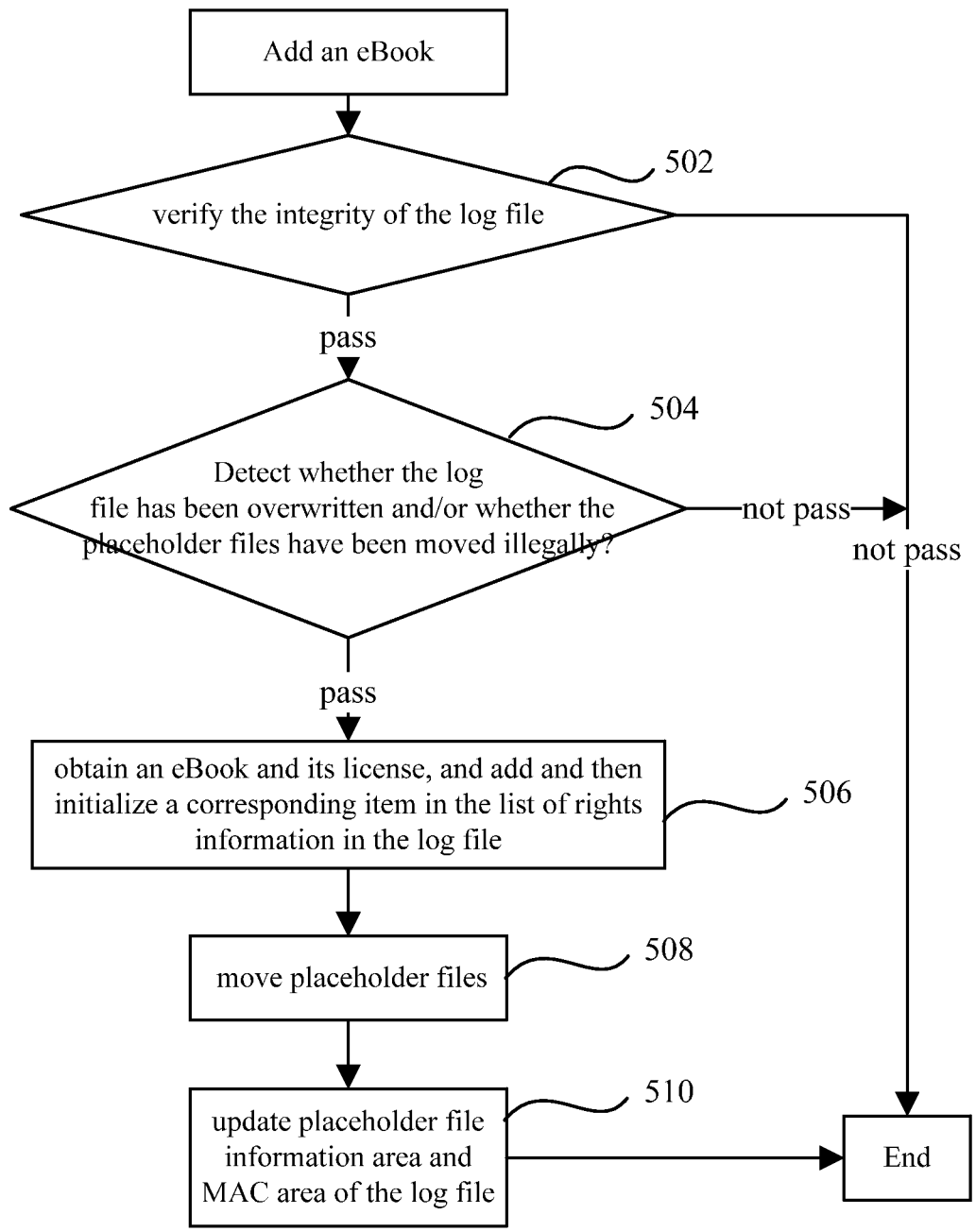
FIG. 5 shows a flowchart of a method for preventing replay attacks when an eBook is added according to an embodiment of this invention.

FIG. 5 shows a flowchart of a method for preventing replay attacks when an eBook is added according to an embodiment of this invention;

In this embodiment, when an eBook is added by a user with the DRM controller on a client, the DRM controller on the client carries out steps shown in FIG. 5.

At step 502, the integrity of the log file is verified based on the MAC area of the log file. If the verification fails, the user is prevented from adding an eBook; if the verification is passed, the method proceeds to step 504. At step 504, data of actual locations of placeholder files in the storage medium is obtained, to determine whether the data of actual location is consistent with location data represented by a hash value in the placeholder file information area of the log file, and thereby to determine whether the log file has been overwritten by a previous duplication and/or whether the placeholder files has been moved illegally. If the detection is not passed, the user is prevented from continuing to add an eBook; if the detection is passed, the method proceeds to step 506. At step 506, an eBook to be newly added and its license are obtained, and an item for storing user's use of stateful rights of the eBook is added and then initialized in the list of rights information in the log file. At step 508, locations of the placeholder files on the hard disk are changed, i.e., the placeholder files are moved according the method described above. At step 510, a hash value of placeholder file location information is regenerated according to new location information of the placeholder files, to replace content in the placeholder file information area in the log file with the new hash value; a MAC value is regenerated for contents in the placeholder file information area and the list of rights information to replace original content in the MAC area with the new MAC value.

Figure 6:
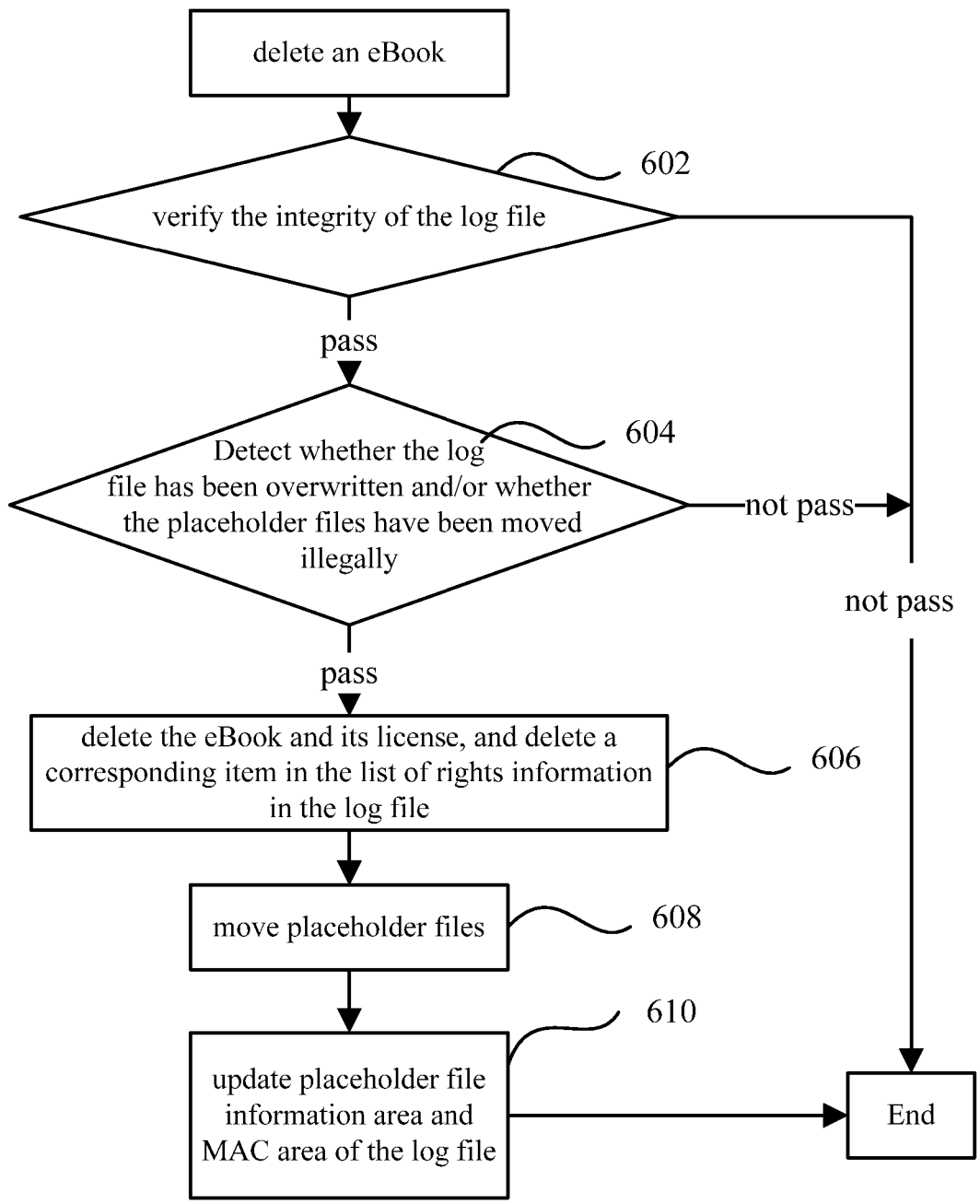
FIG. 6 shows a flowchart of a method for preventing replay attacks when an eBook is deleted according to an embodiment of this invention.

FIG. 6 shows a method for preventing replay attacks when an eBook is deleted according to an embodiment of this invention.

In this embodiment, when a user deletes an eBook with the DRM controller on a client, the DRM controller on a client carries out steps shown in FIG. 6. At step 602, the integrity of the log file is verified based on the MAC area of the log file. If the verification is not passed, the user is prevented from deleting an eBook; if the verification is passed, the method proceeds to step 604. At step 604, data of actual locations of placeholder files in the storage medium is obtained, to determine whether the data of actual location is consistent with location data represented by a hash value in the placeholder file information area of the log file, and thereby to determine whether the log file has been overwritten by a previous duplication and/or whether the placeholder files have been moved illegally. If the detection is not passed, the user is prevented from continuing to delete an eBook; if the detection is passed, the method proceeds to step 606. At step 606, an eBook to be deleted and its license are deleted, and an item for storing user's use of stateful rights of the eBook is deleted from the list of rights information in the log file. At step 608, locations of the placeholder files on the hard disk are changed, i.e., the placeholder files are moved according the method of moving the placeholder files as described above. At step 610, a hash value of placeholder file location information is regenerated according to new location information of the placeholder files, to replace original content in the placeholder file information area in the log file with the new hash value; a MAC value is regenerated for contents in the placeholder file information area and the list of rights information to replace original content in the MAC area with the new MAC value.

Figure 7:
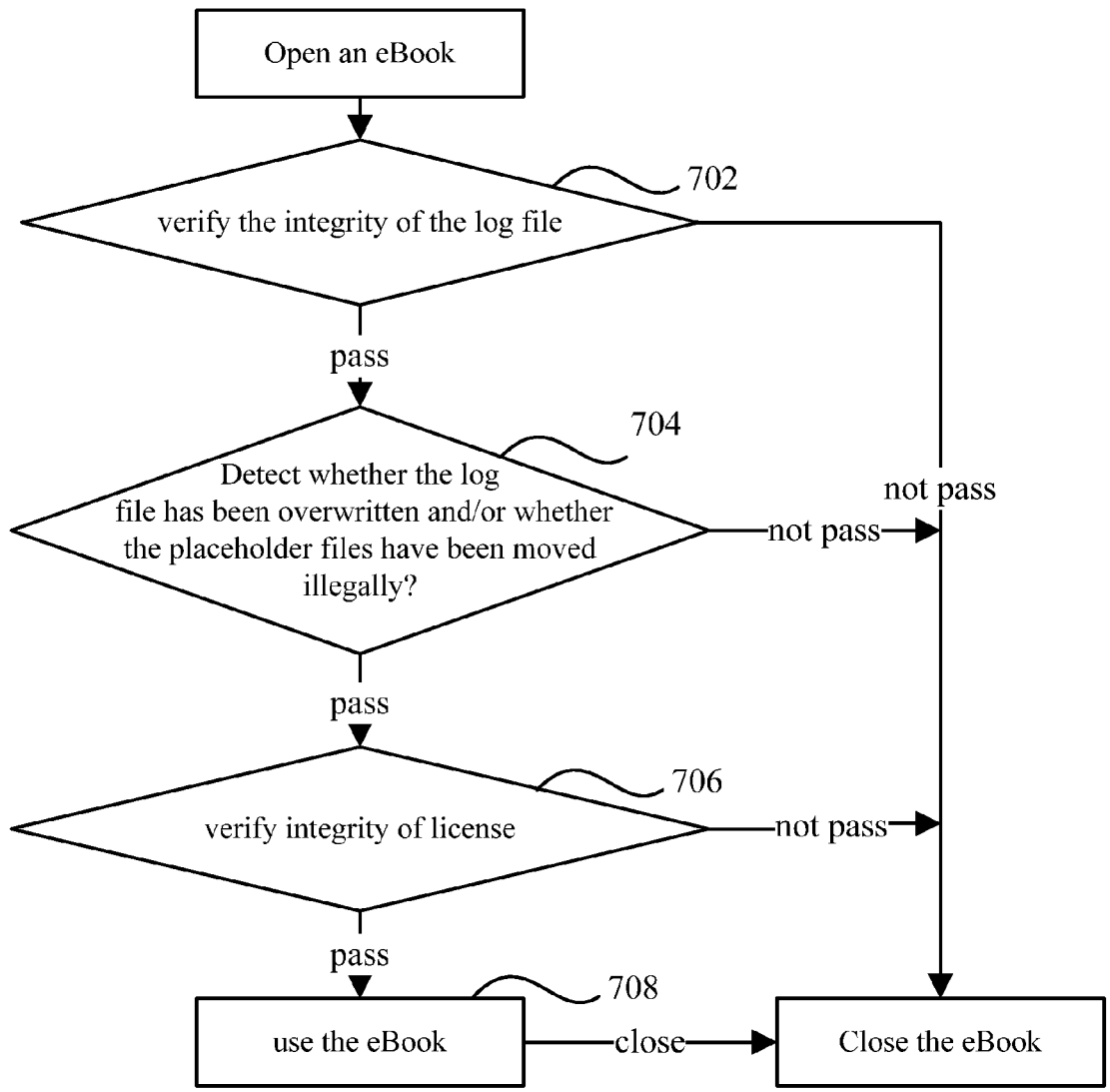
FIG. 7 shows a flowchart of a method for preventing replay attacks when an eBook is opened according to an embodiment of this invention.

FIG. 7 shows a method for preventing replay attacks when the eBook is opened according to an embodiment of this invention.

In the embodiment of this invention, when a user opens an eBook, the DRM controller on a client carries out steps shown in FIG. 7. At step 702, the integrity of the log file is verified based on the MAC area of the log file. If the verification is not passed, the user is prevented from continuing using the eBook; if the verification is passed, the method proceeds to step 704. At step 704, data of actual locations of placeholder files in the storage medium is obtained, to determine whether the data of actual location is consistent with location data represented by a hash value in the placeholder file information area of the log file, and thereby to determine whether the log file has been overwritten by a previous duplication and/or whether the placeholder files has been moved illegally. If the detection is not passed, the user is prevented from continuing to use the eBook; if the detection is passed, the method proceeds to step 706. At step 706, the integrity of a license is verified by means of the digital content license's signature. If the verification is not passed, the user is prevented from continuing to use the eBook; if the verification is passed, the method proceeds to step 708, in which the user is allowed to use the eBook.

Figure 8:
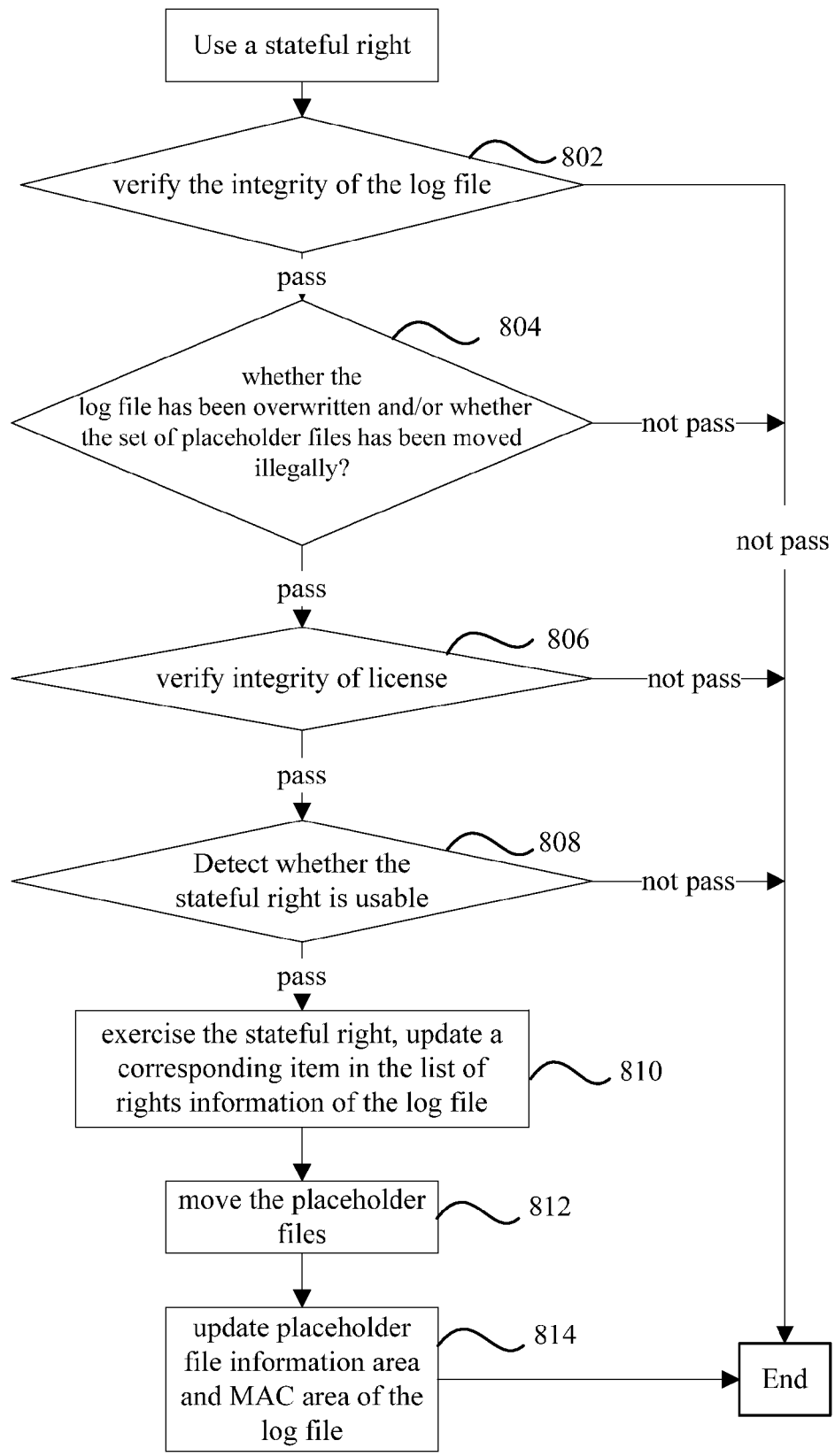
FIG. 8 shows a flowchart of a method for preventing replay attacks when a stateful right is used according to an embodiment of this invent ion.

FIG. 8 shows a flowchart of a method for preventing replay attacks when a stateful right is used according to an embodiment of this invention;

In this embodiment, a user may employ two stateful rights. The first one is printing, each time the user prints the content of an eBook, the DRM controller on the client increases a print count in a corresponding item of the list of rights information in the log file by 1. When the print count reaches a printable count specified as a right constraint, the user is not allowed to print the content of the eBook any more. The second one is reading. Since the eBook is opened, at 1 min intervals, the DRM controller on the client increases a read time in a corresponding item of the list of rights information in the log file by 1 min. When the read time reaches an accumulated time specified as a right constraint, the user is not allowed to read the eBook any more. When a user makes use of a stateful right, the DRM controller on a client carries out steps shown in FIG. 8. At step 802, the integrity of the log file is verified based on the MAC area of the log file. If the verification is not passed, the user is prevented from continuing to use the eBook; if the verification is passed, the method proceeds to step 804. At step 804, data of actual locations of placeholder files in the storage medium is obtained, to determine whether the data of actual location is consistent with location data represented by a hash value in the placeholder file information area of the log file, and thereby to determine whether the log file has been overwritten by a previous duplication and/or whether the placeholder files have been moved illegally. If the detection is not passed, the user is prevented from continuing to use the eBook; if the detection is passed, the method proceeds to step 806. At step 806, the integrity of a license is verified by means of the digital content license's signature. If the verification is not passed, the user is prevented from continuing to use the eBook; if the verification is passed, the method proceeds to step 808, in which it is detected whether the user is allowed to employ the stateful right based on a corresponding item of the list of rights information in the log file. If the detection is not passed, the user is prevented from employing the stateful right. If the detection is passed, the method proceeds to step 810 to execute the stateful right and update the corresponding item of the list of rights information in the log file. At step 812, locations of the placeholder files on the hard disk are changed (change locations of placeholder files of a source device on the hard disk of the source device, and change locations of placeholder files of a target device on the hard disk of the target device). At step 814, a hash value of placeholder file location information is regenerated based on new location information of the placeholder files to replace original content in the placeholder file information area of the log file with the new hash value; a MAC value is regenerated for contents in the list of rights information and the placeholder file information area to replace original content in the MAC area with the new MAC value.

Figure 9:
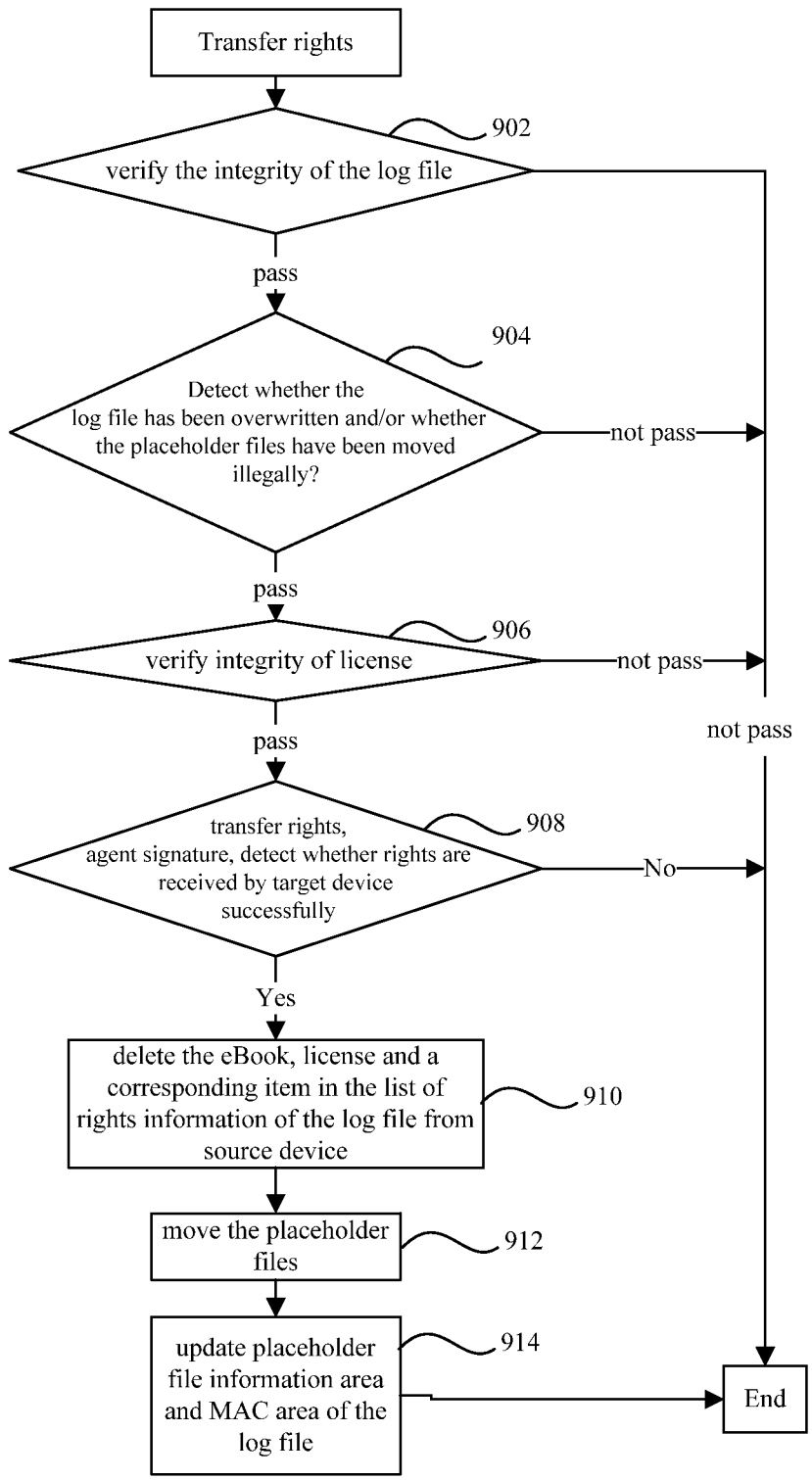
FIG. 9 shows a flowchart of a method for preventing replay attacks when rights are transferred according to an embodiment of this invention.

FIG. 9 shows a flowchart of a method for preventing replay attacks when rights are transferred according to an embodiment of this invention.

In this embodiment, when a user transfers rights he/she owned on a device (source device) to another device (target device), the DRM controller on a client carries out steps shown in FIG. 9. At step 902, the integrity of the log file is verified based on the MAC area of the log file. If the verification is not passed, the user is prevented from transferring rights (including stateful rights and stateless rights); if the verification is passed, the method proceeds to step 904. At step 904, data of actual locations of placeholder files in the storage medium is obtained, to determine whether the data of actual location is consistent with location data represented by a hash value in the placeholder file information area of the log file, and thereby to determine whether the log file has been overwritten by a previous duplication and/or whether the placeholder files have been moved illegally. If the detection is not passed, the user is prevented from transferring rights; if the detection is passed, the method proceeds to step 906. At step 906, the integrity of a license is verified by means of the digital content license's signature. If the verification is not passed, the user is prevented from transferring rights; if the verification is passed, the method proceeds to step 908. At step 908, rights are transferred from the source device to the target device. The DRM controller on the source device signs a digital content license on the target device using an agent signature technique. If the target device does not receive the rights transferred successfully, the rights transfer process is terminated; if the target device receives the rights transferred successfully, the method proceeds to step 910. At step 910, a corresponding eBook, its license and a corresponding item in the list of rights information in the log file are deleted from the source device. At step 902, locations of placeholder files on the hard disk are changed. At step 914, a hash value of placeholder file location information is regenerated based on new location information of the placeholder files to replace original content in the placeholder file information area of the log file with the new hash value; a MAC value for contents in the list of rights information and the placeholder file information area is regenerated, and the original content in the MAC area are replaced with the new MAC value.

It can be seen from the above operation processes, each time the user adds, deletes a digital content, or makes use of a stateful right or transfers rights owned on a device to another device with the DRM controller on the client, the DRM controller on the client updates the list of rights information of the log file, moves the placeholder files, changes the sizes of the placeholder files, writes up-to-date placeholder file location information after a hash transformation to the placeholder file information area in the log file, generates a MAC value for contents in the list of rights and the placeholder file information area, and replaces an old MAC value in the MAC area of the log file with the new MAC value.

As to the list of rights information in the log file, each time the user makes use of a stateful right, the DRM controller on the client needs to determine whether the user is allowed to employ the stateful right based on the use condition of the stateful right recorded in a corresponding item of the list of rights information. If allowed, the process proceeds with subsequent operations, and a corresponding item in the list of rights information is updated after the exercise of the stateful right. If forbidden, the user is prevented from employing the stateful right. Once the user transfers rights owned on a device to another device, after the target device receives the rights successfully, the DRM controller on the client deletes an item corresponding to the transferred rights in the list of rights information. Each time the user adds a digital content, the DRM controller on the client adds and then initializes an item for storing use conditions of stateful rights of the digital content by the user in the list of rights information. Each time the user deletes a digital content, the DRM controller on the client deletes an item for storing use conditions of stateful rights of the digital content by the user in the list of rights information.

As to the placeholder file information area of the log file, each time the user opens a digital content, the DRM controller on the client needs to detect whether a hash value of actual storage locations of the placeholder files after a hash transformation is consistent with content in the placeholder file information area of the log file. If consistent, the user is permitted to use the digital content; if inconsistent, the user is prevented from further using the digital content. Each time the user makes use of a stateful right, the DRM controller on the client needs to detect whether a hash value of actual storage locations of the placeholder files after a hash transformation is consistent with content in the placeholder file information area of the log file. If consistent, the process proceeds with subsequent operations: change locations of the placeholder files on the storage medium after exercising the stateful right, regenerate a hash value of location information to replace content in the placeholder file information area with the new hash value; if inconsistent, the user is prevented from further using the digital content. Each time the user transfers rights owned on one device to another device, the DRM controller on the client needs to detect whether a hash value of actual storage locations of the placeholder files after a hash transformation is consistent with content in the placeholder file information area of the log file. If consistent, the process proceeds with subsequent operations: after the target device receives the rights successfully, change locations of the placeholder files on the storage medium; regenerate a hash value of location information to replace content in the placeholder file information area with the new hash value; if inconsistent, the user is prevented from transferring the rights. Each time the user adds or deletes a digital content, the DRM controller on the client needs to detect whether a hash value of actual storage locations of the placeholder files after a hash transformation is consistent with content in the placeholder file information area of the log file. If consistent, the process proceeds with subsequent operations: after the digital content is added or deleted successfully, change locations of the placeholder files on the storage medium; regenerate a hash value of location information to replace content in the placeholder file information area with the new hash value; if inconsistent, the user is prevented from adding or deleting the digital content. The placeholder file information area of the log file may be used to detect whether the placeholder files have been moved illegally or whether the log file has been overwritten by a previous duplication, which is critical for preventing replay attacks to stateful rights of a digital content in this invention.

As to the MAC area of the log file, each time the user opens a digital content, makes use of a stateful right, transfers rights owned on a device to another device, or adds/deletes a digital content with the DRM controller on the client, the DRM controller on the client first calculates a MAC value of contents in the list of rights information and the placeholder file information area, and then compares the value with content in the MAC area. If consistent, the process proceeds with a subsequent verification process; if inconsistent, the user is prevented from carrying out this operation. Whenever there is a change in the list of rights information or the placeholder file information area of the log file, the DRM controller on the client must regenerate a MAC value and replace content in the MAC area with the new MAC value. The MAC area of the log file may be used to verify the integrity of the log file itself.

Thus, instead of introducing additional hardware or relying on online detection by a server, this invention is completely based on detection on the client, meeting the requirements of universality and convenience. Effectiveness of this invention will be described below. As to a digital content license, if the content of the digital content license is changed by a user, the user' illegal behaviour may be detected by the DRM controller on the client based on the digital signature of the digital content license. Since the use condition of the stateful rights by a user is not recorded in the digital content license, the purpose of replay attack will not be implemented by overwriting the current license with a earlier duplicate of the digital content license. As to the log file, if the user changes the content of the log file, the DRM controller on the client may detect the illegal act of the user based on the MAC area of the log file. If a user overwrites the current log file with a previous duplication to make a replay attack, because the placeholder files have been moved, the user' illegal behaviour may be detected by the DRM controller on the client based on the placeholder file information area of the log file. As to the placeholder files, because overwriting with a file having the same file name does not change the initial address of the file, overwriting a current placeholder file with a previous duplication of the placeholder file cannot achieve the propose of restoring the placeholder file to its original location. If the user changes the location of the placeholder file manually, the user's illegal behaviour may be detected by the DRM controller on the client based on the placeholder file information area of the log file. Because placeholder files are moved in this invention without resorting to file manipulation commands provided on the OS, the user cannot make an intervention in the placeholder files' storage locations. It is impossible for the user to store a placeholder file to a specified location. Further, a hash value of placeholder file location information after a hash transformation is stored in the placeholder file information area of the log file, the user cannot acquire location information from the placeholder file information area.

In summary, this invention may prevent users from making replay attacks to stateful rights of a digital content, and may detect users' behaviour of tampering with the digital content license and the log file.

Further, it should be noted that users may upgrade their machines' hardware, reinstall their OSs, have their machine damaged or lost, delete their log files or digital content licenses or placeholder files by chance, or the log file or digital content license may be distorted maliciously by third-party software (virus, for example), illegal movement of placeholder files may arise accidentally, which may cause unexpected loss of access to purchased digital contents. In order to address this problem, the licensing server may not only issue digital content license to the user who purchases the ebook, but the list of rights information in the log file on each user's client may be backed up and a right recovery service may be provided, including redownloading eBooks, reissuing digital content licenses, initializing placeholder files and regenerating a log file.

A user may back up his/her list of rights information to the license server with the DRM controller on the client, when he/she has lost access to an eBook, the license server may recovery the user's rights according to the last backup of the list of rights information. Further, whenever the user buys a new eBook, the DRM controller on the client may back up the list of rights information in the local log file to the license server automatically.

Regardless of active backup by the user or passive backup when the eBook is purchased, the license server may verify the validity of the log file through the DRM controller on the client. In the case of active backup by a user, if the verification is not passed, it is rejected to back up the list of rights information for the user, until the log file is recovered to a valid state through the right recovery service; if the verification is passed, the present list of rights information on the client is backed up to the server side. When the user purchase an eBook, if the verification is not passed, it is rejected to issue a digital content license to the user, until the log file is recovered to a valid state through the right recovery service; if the verification is passed, a digital content license is issued to the user, and the list of rights information is backed up to the server side after the log file is updated.

To enable the timely recovery of digital content right that has been lost accidentally for the user, whenever the DRM controller on the client detects an invalid digital content license, an invalid log file or invalid placeholder files, the user may be prompted to recover his/her right and may be directed to login a corresponding webpage.

For the interests of both digital content providers and users, digital content providers may take some measures to encourage users to back up their right information lists from their clients to a server periodically, and the charge standard for right recovery of the server may be associated with the enthusiasm of a user for backing up their right information lists to prevent the user from abusing the right recovery service.

Below some charge modes of the right recovery service according to embodiments of this invention will be described. The right recovery service depends on right information lists backed up by users last time. However, some stateful rights might be consumed by users since then, and the longer the interval is, the more stateful rights users might consume. To prevent some users from trying to gain consumed stateful rights through such a service, this service is not free. For the reasonableness of various charge modes and encouraging users to back up their digital content licenses actively, the following indicators should be considered in cost estimation:

first, the amount of stateful rights to be recovered by a user, the larger amount, the higher cost to be charged;

second, the frequency of backing up digital content licenses in a recent period of time, the higher frequency, the lower cost to be charged;

third, the frequency of recovering digital content licenses in a recent period of time, the higher frequency, the higher cost to be charged.

This invention does not have special limitations on the format of placeholder files, which may be files in any formats, such as text or bitmap files.

This invention does not have special limitations on the type of digital contents, which is not limited to eBooks in embodiments of this invention, but also may be audio, video, images, moving pictures, softwares, etc. For example, the use record may be the number of times of playing an audio file, the number of times of playing a video file, the number of times of copying an image, the number of times of playing a moving picture, the number of times of running a software product, etc. The method of preventing replay attacks is the same for the above medium types as that of the embodiments herein, which will not be described further.

In summary, this invention provides a method of preventing replay attacks to stateful rights, which does not introduce additional hardware and does not rely on online detection by a server, and which is completely based on a client. If a log file has not been overwritten by a previous duplication and/or a set of placeholder files has not been moved illegally, the actual location of the set of the placeholder files should be consistent with placeholder file location information recorded; if it is determined that the actual location of the placeholder files is not consistent with the recorded location information of the placeholder file, it may be determined that the log file has been overwritten by a previous duplication and/or the set of placeholder files has been moved illegally, and thus replay attacks to stateful rights may be prevented, satisfying the requirements of validity, convenience and universality at the same time.

Figure 10:
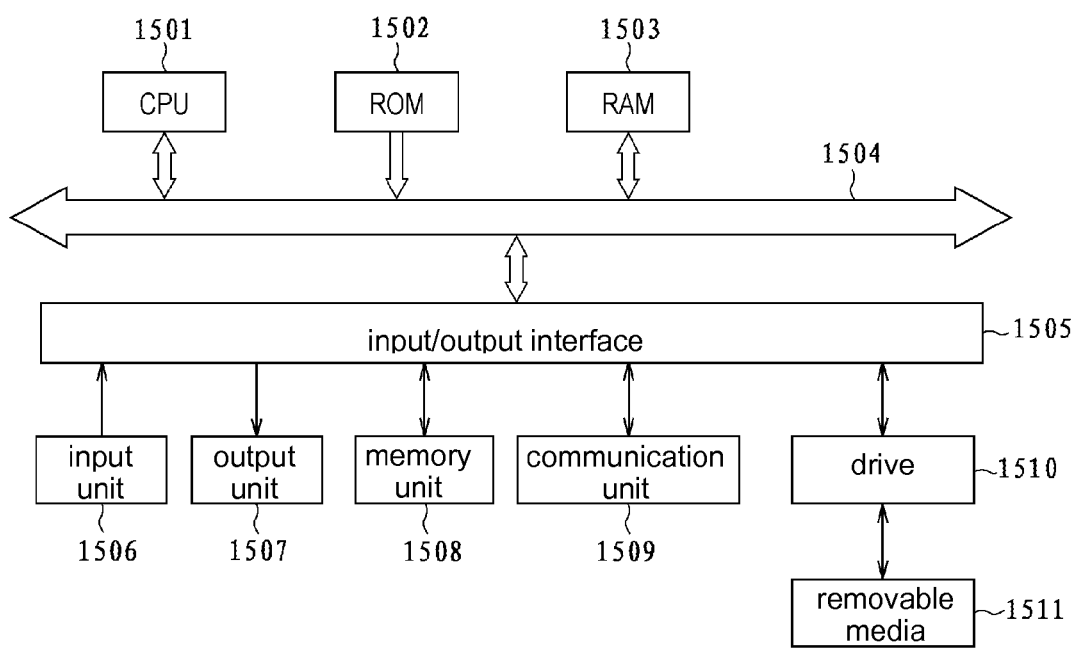
FIG. 10 shows a block diagram of an example of the structure of a computer.

FIG. 10 shows a block diagram of an exemplary computer hardware structure for carrying out the above processes.

A central processing unit (CPU) 1501, read-only memory (ROM) 1502 and random access memory (RAM) 1503 are connected with each other through a bus 1504.

An input/output (I/O) interface 1505 is connected to the bus 1504. Input units 1506 such as a keyboard or mouse and output units 1507 such as a display or a speaker are connected to the I/O interface 1505. In addition, a memory unit 1508 such as a hard disk or non-volatile memory, a communication unit 1509 such as a network interface and a driver 1510 for driving removable media 1511 are connected to the I/O interface 1505.

In the computer configuration described above, the CPU 1501 loads programs stored in the memory unit 1508 to RAM 1503 through the I/O interface 1505 and the bus 1504, and executes the programs to perform the above processes.

The programs executed by the CPU 1501 may be, for example, recorded on the removable media 1511 or may be provided through wired or wireless transmission media (e.g. a LAN, the Internet, or digital broadcasting), and installed in the memory unit 1508.

The programs executed by the computer may be executed according to the order described above, or may be processed whenever necessary (for example, by all).

What are described above are merely preferred embodiments of the present invention, but do not limit the protection scope of the present invention. Various modifications or variations can be made to this invention by persons skilled in the art. Any modifications, substitutions, and improvements within the scope and spirit of this invention should be encompassed in the protection scope of this invention.

What is claimed is:

1. An apparatus for preventing replay attacks, the apparatus comprising:
    a terminal including a storage medium and a central processing unit (CPU), the storage medium having a plurality of instruction units stored thereon configured for being executed by the CPU to perform operations, the plurality of instruction units including:
    an acquisition unit for, when a request for operating a digital content is received, acquiring current location information of a set of placeholder files in the storage medium of the terminal;
    a determination unit for determining whether the current location information is consistent with recorded location information of the placeholder file in the storage medium of the terminal, wherein the current location information is consistent with the recorded location information when the current location information is the same as the recorded location information, and the current location information is inconsistent with the recorded location information when the current location information is different than the recorded location information, and an operation on the digital content is permitted when the determination unit determines consistency;
    a protection unit for, when the determination unit determines inconsistency, preventing the operation on the digital content;
    a moving unit, for moving the location of the set of placeholder files in the storage medium of the terminal and modifying sizes of the set of placeholder files that is moved, after the operation on the digital content; and
    an update unit, for, in response to movement of the location of the set of placeholder files, updating the current location information of the set of placeholder files and defining new location information according to the movement of the location of the set of placeholder files, wherein the new location information is used as the recorded location information in a subsequent determination of the determination unit,
    wherein there is a correspondence between the digital content and the set of placeholder files in the storage medium of the terminal.

2. The apparatus of claim 1, wherein the protection unit is further configured to perform the operation on the digital content when the determination unit determines consistency;
    the update unit of the plurality of instruction units is further configured to store current location information of the set of placeholder files in the storage medium of the terminal, generate a hash value based on new location information of the set of placeholder files, replace the placeholder file location information with the hash value in the storage medium of the terminal, and update use records of the digital content in the storage medium of the terminal,
    wherein, the set of placeholder files comprises at least one placeholder file.

3. The apparatus of claim 2, wherein updating use records of the digital content by the update unit comprises updating a list of rights information in the log file in the storage medium of the terminal, wherein the list of rights information is configured to record rights use information corresponding to the digital content.

4. The apparatus of claim 1, wherein the recorded location information of the placeholder file is stored in a placeholder file information area of the log file in the storage medium of the terminal;
    the log file further comprises a message authentication code area for storing a MAC (Message Authentication Code) of the list of rights information and the placeholder file information area.

5. The apparatus of claim 4, wherein the judgment unit is further configured to, before acquiring the current location information of the set of placeholder files, generate a MAC according to contents of the list of rights information and the placeholder file information area, determine whether the MAC is consistent with content stored in the message authentication code area of the log file;

the protection unit is further used to prevent performing the operation on the digital content when inconsistency is determined.

6. The apparatus of claim 1, wherein the operation comprises at least one of adding the digital content, deleting the digital content, using a stateful right or transferring rights of the digital content owned on the terminal to another terminal, the placeholder files including image files.

7. The apparatus of claim 6, wherein the determination unit is further configured to, when the operation makes use of a stateful right, determine whether the stateful right is useable according to rights use information of the log file corresponding to the digital content.

8. A method for preventing replay attacks, the method comprising:
at a terminal including a storage medium and a central processing unit (CPU), receiving a request for performing an operation on a digital content stored in the storage medium of the terminal, and acquiring current location information of a set of placeholder files stored in the storage medium of the terminal;
determining whether the current location information of the set of placeholder files stored in the storage medium of the terminal is consistent with recorded location information of the placeholder files and generating a determination result, wherein the current location information is consistent with the recorded location information when the current location information is the same as the recorded location information, and the current location information is inconsistent with the recorded location information when the current location information is different than the recorded location information, and the operation on the digital content is permitted when the determination result is consistent;
when the determination result is inconsistent, preventing the operation on the digital content;
moving the location of the set of placeholder files in the storage medium of the terminal and modifying sizes of the set of placeholder files that is moved, after the operation on the digital content; and
in response to movement of the location of the set of placeholder files, updating the current location information of the set of placeholder files and defining new location information according to the movement of the location of the set of placeholder files, wherein the new location information is used as the recorded location information in a subsequent determination of the determination step,
wherein there is a correspondence between the digital content and the set of placeholder files stored in the storage medium of the terminal.

9. The method of claim 8, further comprising:
when the determination result is consistent, performing the operation on the digital content;
updating use records of the digital content in the storage medium of the terminal;
wherein the set of placeholder files comprises at least one placeholder file; and
the step of updating comprises:
storing current location information of the set of placeholder files in the storage medium of the terminal, generating a hash value based on new location information of the set of placeholder files, replacing the placeholder file location information with the hash value in the storage medium of the terminal.

10. The method of claim 9, wherein updating use records of the digital content comprises:

updating a list of rights information in a log file stored in the storage medium of the terminal, wherein the list of rights information is configured to record rights use information corresponding to the digital content.

11. The method of claim 8, wherein when the recorded location information of the placeholder file is stored in a placeholder file information area of the log file, the method further comprises:
the log file further comprises a message authentication code area for storing a MAC of the list of rights information and the placeholder file information area in the storage medium of the terminal.

12. The method of claim 11, wherein before acquiring the current location information of the set of placeholder files stored in the storage medium of the terminal, generating a MAC according to contents of the list of rights information and the placeholder file information area, determining whether the MAC is consistent with content stored in the message authentication code area stored in the storage medium of the terminal;
when inconsistency is determined, preventing the operation on the digital content.

13. The method of claim 8, wherein the operation comprises at least one of adding the digital content, deleting the digital content, using a stateful right or transferring rights of the digital content owned on the terminal to another terminal, the placeholder files including image files.

14. The method of claim 13, wherein when the operation makes use of a stateful right, the method further comprises:
determining whether the stateful right is useable according to the rights use information corresponding to the digital content in the log file stored in the storage medium of the terminal.

15. An apparatus for preventing replay attacks, the apparatus comprising:
a terminal including a storage medium having instructions stored thereon and a central processing unit (CPU) configured to execute instructions for:
receiving a request for performing an operation on a digital content stored in the storage medium of the terminal, and acquiring current location information of a set of placeholder files stored in the storage medium;
determining whether the current location information stored in the storage medium is consistent with recorded location information of the placeholder files stored in the storage medium, wherein the current location information is consistent with the recorded location information when the current location information is the same as the recorded location information, and the current location information is inconsistent with the recorded location information when the current location information is different than the recorded location information, and the operation on the digital content is permitted when the determination result is consistent;
when the determination result is inconsistent, preventing the operation on the digital content stored in the storage medium;
moving the location of the set of placeholder files in the storage medium of the terminal and modifying sizes of the set of placeholder files that is moved, after the operation on the digital content; and
in response to movement of the location of the set of placeholder files, updating the current location information of the set of placeholder files and defining new location information according to the movement of the location of the set of placeholder files, wherein the new location information is used as the recorded location information in a subsequent determination of the determination step, wherein there is a correspondence between the digital content stored in the storage medium and the set of placeholder files stored in the storage medium.

* * * * *